United States Patent

Anderson

[15] 3,701,946

[45] Oct. 31, 1972

[54] DEVICE FOR TRANSMITTING AND DISPLAYING SCORES ON TELEVISION AND RADIO RECEIVERS

[72] Inventor: Duane S. Anderson, 1142 Heather Lane, Glen Ellyn, Ill. 60137

[22] Filed: Dec. 11, 1970

[21] Appl. No.: 97,063

[52] U.S. Cl. ....................325/64, 325/455, 325/457, 334/86

[51] Int. Cl. ..............................................H04b 1/00

[58] Field of Search........325/31, 51, 54, 47, 64, 455, 325/457; 343/225, 226, 228, 200; 334/86

[56] References Cited

UNITED STATES PATENTS

| | | | |
|---|---|---|---|
| 3,577,080 | 5/1971 | Cannalte et al | 325/64 |
| 3,506,916 | 4/1970 | Mixsell et al. | 325/31 |
| 3,119,558 | 1/1964 | Kinross | 325/31 |
| 3,012,245 | 12/1961 | Purington | 343/225 |

*Primary Examiner*—Albert J. Mayer
*Attorney*—Hill, Sherman, Meroni, Gross & Simpson

[57] ABSTRACT

System and apparatus for presenting to radio and TV users secondary information such as scores in sports events. Periodically, auxiliary information is transmitted with the radio and television signals which is detected at the receiver and supplied to an auxiliary presentation device which continuously presents the auxiliary information to the user.

3 Claims, 6 Drawing Figures

INVENTOR.
DUANE S. ANDERSON

BY Hill, Sherman, Meroni, Gross & Simpson ATTORNEYS

INVENTOR.

DUANE S. ANDERSON

BY Hill, Sherman, Meroni, Gross & Simpson ATTORNEYS

DEVICE FOR TRANSMITTING AND DISPLAYING SCORES ON TELEVISION AND RADIO RECEIVERS

BACKGROUND OF THE INVENTION

1. Field of the Invention

This invention relates in general to communication systems and in particular to method and apparatus for presenting auxiliary information to radio and television users, for example.

2. Description of the Prior Art

Many times, users of radio and television tune in sports events such as football, baseball or other types of sports events while the game is in progress. The score may not be given by the announcer who assumes that the viewers and listeners have continuously been watching since the beginning of the sports events, and some little time may pass before the score is announced. There are also other times when auxiliary information is available to television and radio users. It has been known in the prior art to transmit video messages which are superimposed on cathode ray tubes over the standard program. For example, advertising and curfew messages have been presented on cathode ray tubes by superimposing the messages on the normal programming material. However, such systems require complicated apparatus and are not feasible in radio applications since there is no cathode ray tube upon which auxiliary information may be superimposed.

SUMMARY OF THE INVENTION

The present invention comprises an auxiliary presentation device which continuously presents to television and radio users information such as scores if football, baseball, or other sports events and may also be used to present other forms of information. The presentation may take the form of a pair of counters which are electronically or electromechanically controlled, which are energized through a suitable modulation and detecting scheme so as to continuously present the desired auxiliary information.

The invention may be utilized with standard AM broadcast stations using amplitude modulation and with frequency modulation stations of either monaural or stereophonic types. The system may also be used with FM stations using multiplex or sub-channel authority as well as in all types of non-public radio communication services. It may also be used in broadcast television systems or closed circuit television systems and may be used in closed circuit public and private telephony systems as well as in private industrial or commercial communications systems. The presentation device may comprise mechanical counters of the digital type which are actuated by linkages coupling the counters to armatures which respond to pulses of magnetic flux and with provisions for resetting the counters by electrical means. Alternatively, counters may be electronic types, as for example, utilizing cold cathode neon glow readout tubes which are electronically controlled.

In addition to sporting event teams scores, information such as time, temperature, results of elections, weather warnings and other forms of auxiliary information may be transmitted. When used by standard AM broadcast stations, the auxiliary information for the invention may be transmitted by short pulses of different tones which amplitude modulate the carrier, for example. At the receiving station, the pulses may be detected and applied to actuate circuitry and components associated with each counter of the auxiliary information presenting device. Periodically, the counter may be reset by the transmission of a suitable tone and the auxiliary information again transmitted so as to energize the counters.

It is to be realized, of course, that other forms of modulation may be utilized to transmit the auxiliary information such as FM or band modulation. In monaural FM broadcast station in addition to using AM modulation for transmission of the auxiliary information it is also possible to transmit useful tones beyond the normal audio range of 15 kilohertz. Simultaneous transmission of the program material as well as the auxiliary information may occur. The invention is useful in many other systems such as stereophonic FM broadcast, storecasting, and in such municipal services as police, fire, forestry, water, sewer departments, which normally use FM services. The system may be used in business and industrial services and many of such services now employ selective calling, which is accomplished by pulse tones and some methods of encoding and decoding or telemetering may be used for the auxiliary information of the present invention.

In television CCTV and CATV usage, the auxiliary information may frequency modulate the audio frequency spectrum or be applied on frequencies above 15,000 Hertz. The invention also has many applications in telephone systems and in private industrial or commercial intercommunications systems.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
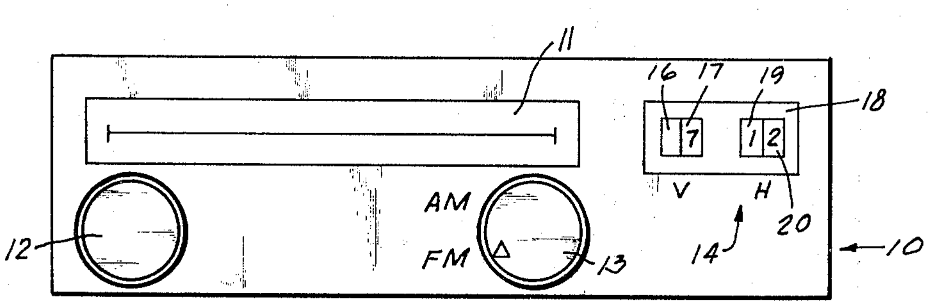
FIG. 1 illustrates the invention installed in a radio receiver.

FIG. 1 illustrates a radio 10 which has a tuning dial 11 and a tuning knob 12. A selector knob 13 may be moved to set the radio to either AM or FM service. The auxiliary information apparatus according to this invention is designated generally as 14 and comprises a plate 18 which has a first pair of counter wheels 16 and 17 for showing the score of the visitor team and a second pair of counter wheels 19 and 20 for showing the score of the home team.

Figures 2, 3:
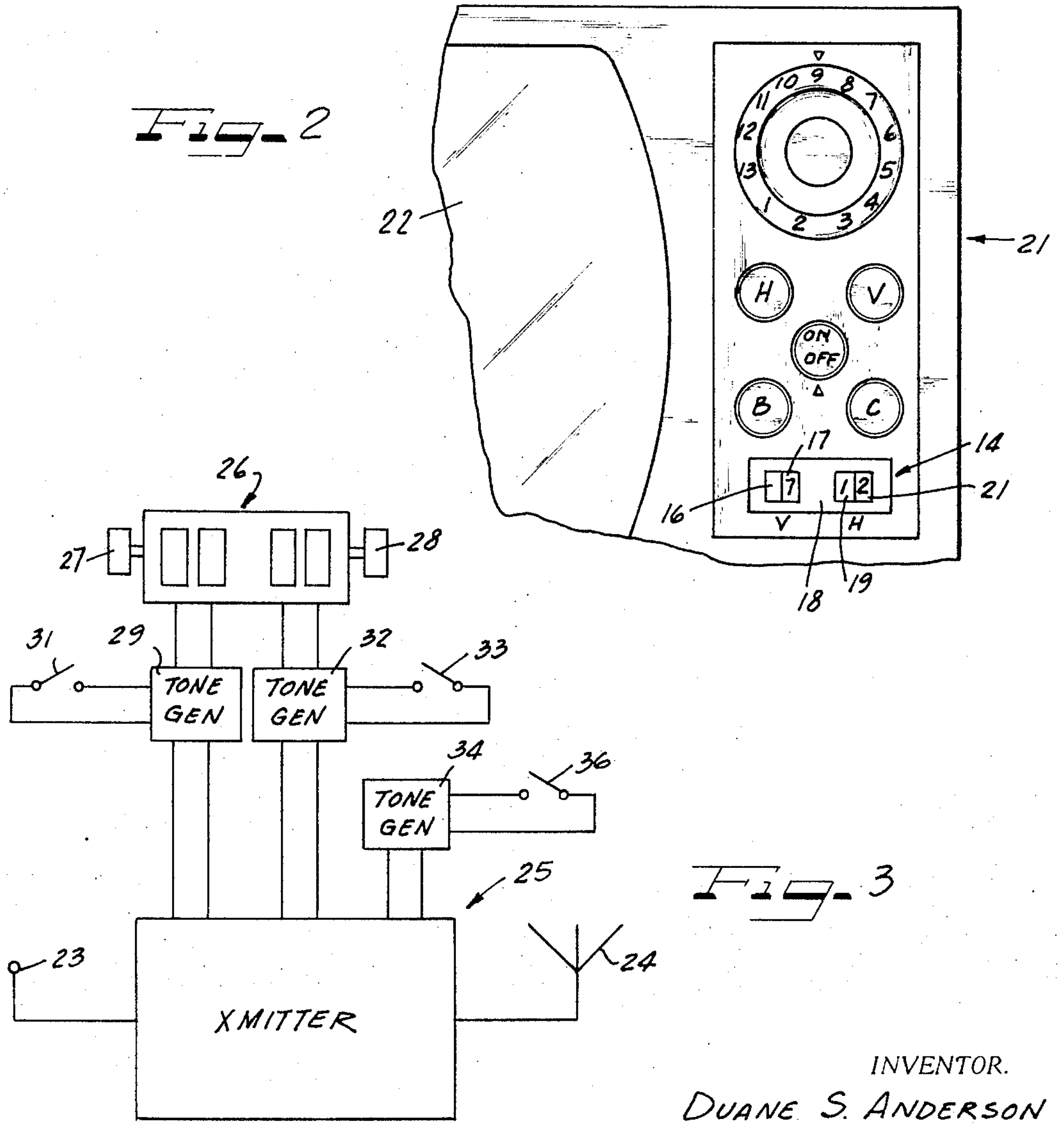
FIG. 2 illustrates the invention installed in a television receiver.
FIG. 3 is a block diagram of a transmitter with the auxiliary information system of the invention installed.

FIG. 2 illustrates the invention installed in a television receiver which is designated generally as 21 and which has a cathode ray tube 22. The television set has conventional controls and includes the auxiliary information device of this invention designated generally as 14 which may be similar to that shown in FIG. 1.

Thus, when a user of radio or TV turns on the set or tunes to a channel which is carrying a sports event, the auxiliary device 14 will immediately indicate the score of the game on the counter wheels 16, 17, 19 and 20.

Figure 4:
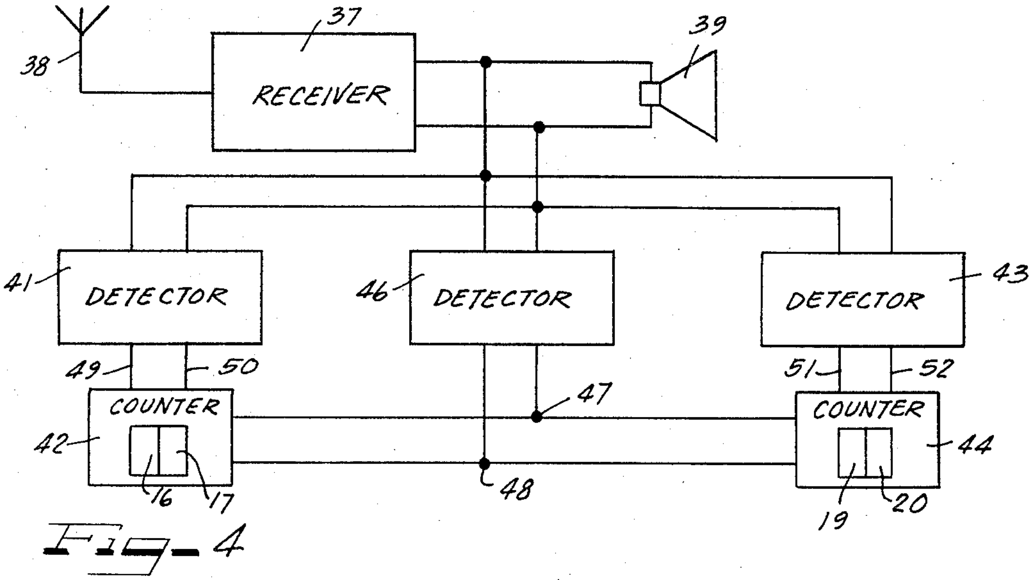
FIG. 4 is a block diagram of a receiving system with the auxiliary information system to the invention installed.

FIGS. 3 and 4 illustrate, respectively, transmitters and receivers in which the auxiliary information system of the invention is incorporated.

FIG. 3 illustrates a transmitter of the broadcast type which might for example be an AM, FM or television broadcasting transmitter which receives an input from an input information source 23 and radiates a signal from the antenna 24. A score indicator 26 is set by knobs 27 and 28 to respectively indicate the scores of home and visiting teams. The score indicator 26 may be eliminated if desired. A first tone generator 29 has a keying switch 31 for energizing it. The tone generator 29 is connected to the transmitter to modulate it with the output tone of the tone generator. A second tone generator 32 produces a tone which has a different frequency from that of the tone generator 29. A keying switch 33 is connected to generator 32 for modulating the output of the transmitter 25 with the output of tone generator 32. A reset tone generator 34 is also connected to the transmitter 25 and is controlled by a reset switch 36.

In operation, periodically the switch 36 is closed to transmit a reset tone for setting the counters at the receiver back to the zero position. Then the tone generator 29 is keyed by the switch 31 for a number of times corresponding to the score of the home team. These pulses are at the frequency of the tone generator 29 and are transmitted on the carrier of the transmitter 25. Then the tone generator 32 is keyed by the switch 33 for a number of times equal to the score of the visiting team which tones are transmitted by the transmitter 25.

A receiver 37 has an antenna 38 and an output means 39 which in radio and television comprise a loudspeaker. The television set, of course, has a video output tube as well. As first detector 41 is tuned to the frequency of the output of the tone generator 29 and detects the pulses corresponding to the number of times the switch 31 is closed and applies an output to terminals 49 and 50 which are connected to the counter 42. A second detector 43 is tuned to the output tone of tone generator 32 and is connected to terminals 51 and 52 which are connected to counter 44. A third detector 46 is tuned to the output of the tone generator 34 and is connected to reset terminals 47 and 48 which are connected to the counters 42 and 44. The detectors 41, 43 and 46 are connected in parallel across the output of the receiver 37.

Figure 5A:
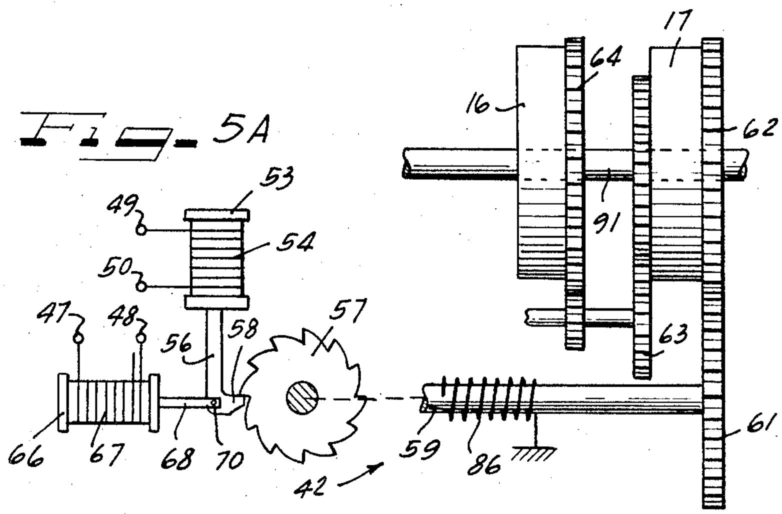
FIGS. 5A and 5B illustrate the counter drives and reset mechanisms of the invention.
Figure 5B:
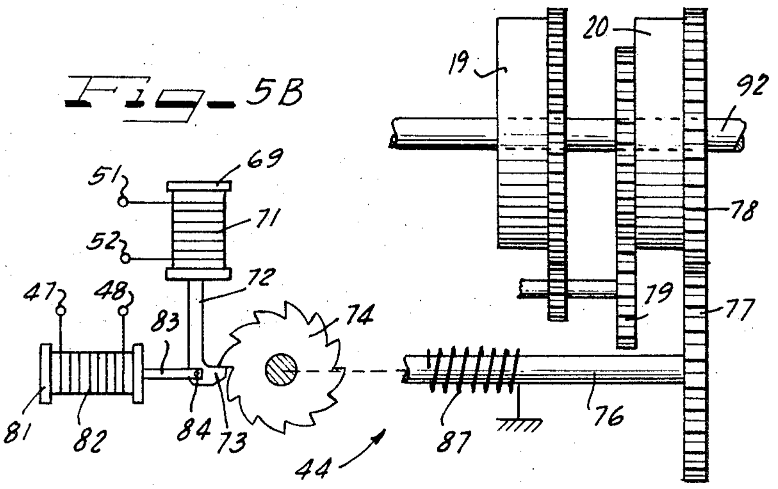

FIGS. 5A and B are detailed views of the counters 42 and 44 of the auxiliary information system of this invention. The counter wheels 16 and 17 are rotatably mounted on a shaft 91 and the unit wheel 17 is attached to a gear 62 which is driven by a gear 61 mounted on a shaft 59. An intermittent linkage 63 couples the counter wheel 17 to the counter wheel 16 which has a gear 64 which meshes with the intermittent motion mechanism 63. The counter mechanism may be a conventional type such as is well known to those skilled in the art.

A ratchet wheel 57 is mounted on shaft 59 and is formed with teeth which are engaged by a ratchet 56 which has an engaging portion 58 for engaging the ratchet wheel 57. A relay 53 has an energizing coil 54 which is connected to terminals 49 and 50 that receive the output of the detector 41 as shown in FIG. 4. Each time an electrical pulse is applied to terminals 49 and 50, the relay 53 is energized and moves the ratchet wheel 57 one notch. A spring 86 biases the counter wheels 16 and 17 back to the zero position. A reset relay 66 has a reset coil 67 which is connected to terminals 47 and 48. A linkage 68 of the reset relay 66 is connected to ratchet 56 by pin 70 so as to move it out of engagement with the ratchet wheel 57 when a signal is applied to the terminals 47 and 48 and to allow the counter wheels 16, 17 to return by action of the spring 86 to the zero position.

The counter 44 is similar to counter 42. Counter wheels 19 and 20 are mounted on a shaft 92. The counter wheel 20 is driven by a gear 77 which meshes with a gear 78 attached to the counter 20. An intermittent drive mechanism 79 is coupled between the counter wheel 20 and the counter wheel 19 in a conventional fashion. The gear 77 is mounted on a shaft 76 which carries a ratchet wheel 74 which is engaged by a portion 73 of a ratchet 72. Ratchet 72 is controlled by a relay 69 which has an energizing winding 71 that has input terminals 51 and 52. A second reset relay 81 has a winding 82 that controls a link 83 that is pinned by pin 84 to the ratchet 72 to move it out of engagement with the ratchet wheel 74. The spring 87 biases the counter wheels 19 and 20 back to the zero position when winding 82 is energized moving portion 73 out of engagement with ratchet wheel 74.

In operation, the detector 46 at the receiver is energized by the reset tone from tone generator 34 when the switch 36 is closed. The detector 46 produces an output which is applied to terminals 47 and 48 which simultaneously energizes relays 66 and 81 so as to move the ratchets 56 and 72 respectively out of engagement with the ratchet wheels 57 and 74. The springs 86 and 87 return the counterwheels 16, 17 and 19, 20 to indicate 0–0 . Then the tone generator 34 is de-energized by opening the switch 36 and the relays 66 and 81 are de-energized to allow the ratchets 56 and 72 to respectively engage the ratchet wheels 57 and 74. The tone generator 29 is energized by closing the switch 31 a number of times corresponding to the score of the visitor team. These pulses are detected by the detector 41 and energize the visitor team counter 42 by energizing the relay 53, thus causing the ratchet 56 to move into the confines of the relay 53 for a number of times corresponding to the score of the visitor team. This causes the counter shaft 59 to advance, thus moving the counter wheel 17 and the counter wheel 16 to indicate the score for the visitor team. The tone generator 32 is then energized by closing the switch 33 a number of times corresponding to the score of the home team and the detector 43 detects this signal and applies an input to the relay 69 to advance the counter wheels 20 and 19 to indicate the score of the home team.

The output of the tone generator 29, 32 and 34 may be either AM or FM modulated on the transmitter and a system which is compatible with the particular media utilized will be selected. Since the score does not change very rapidly, the counters need be only periodically reset and the score transmitted but the duty cycle should be such that a listener or viewer tuning in a radio or television station would quickly obtain the score on the auxiliary data device 14 of the invention.

Although the particular embodiment illustrated for presenting the score comprises mechanical counters 42 and 44, it is to be realized that electronic counters using cold cathode neon glow readout tubes, for example, may be utilized. Such presentation devices are well known to those skilled in the art and are readily adapted to indicate the number of pulses transmitted by the tone generators 29, 32 and detected by the detectors 41 and 43.

Also, the device could be mounted in a small separate cabinet and electrically connected to the TV or radio.

It can be seen that this invention provides means for continuously presenting auxiliary information to radio and TV users, and although it has been described with respect to preferred embodiments, it is not to be so limited as changes and modifications may be made therein which are within the full intended scope as defined by the appended claims.

I claim as my invention:

1. Means for transmitting auxiliary display information on a standard video or audio radio frequency communication system having a transmitter radiating a radio frequency carrier which is detectable by a standard television or radio receiver for presenting the standard video or audio information and further including an auxiliary information display device connected to said standard television or audio receiver and including a pair of counters for displaying scores thereon;

a first tone generator at said transmitter producing an output at a first frequency, a first keying means connected to said first tone generator and said first tone generator connected to said transmitter so as to modulate said radio frequency carrier with said first frequency when said first keying means is energized;

a second tone generator at said transmitter producing an output at a second frequency, a second keying means connected to said second tone generator and said second tone generator connected to said transmitter to modulate said radio frequency carrier with said second frequency when said second keying means is energized;

a third tone generator at said transmitter producing an output at a third frequency, a third keying means connected to said third tone generator and said third tone generator connected to said transmitter so as to modulate said radio frequency carrier with said third frequency when said third keying means is energized;

said auxiliary information display including first, second and third detectors tuned respectively to said first, second and third frequencies; the output of said first detector connected to the first one of said pair of counters to drive it, the output of said second detector connected to the second one of said pair of counters to drive it, and reset means for resetting said pair of counters to zero and the output of said third detector connected to said reset means.

2. Means for transmitting auxiliary information according to claim 1 wherein said first and second counters each include ratchet wheels for driving said counters, ratchet relays receiving the outputs of said first and second detectors and having ratchets engageable with said ratchet wheels.

3. Means for transmitting auxiliary information according to claim 2 wherein each of said counters is spring-biased to a zero position and reset relays are connected to each of said ratchets to move them out of engagement with said ratchet wheels so that they return to zero.

* * * * *